United States Patent [19]

Lumier

[11] 3,850,317
[45] Nov. 26, 1974

[54] DEVICE FOR STORING AND HANDLING MATERIAL AND ROD FORM

[75] Inventor: Jacques Lumier, Ispra, Italy

[73] Assignee: European Atomic Energy Community (Euratom), Luxemburg, Luxembourg

[22] Filed: June 21, 1973

[21] Appl. No.: 372,259

[30] Foreign Application Priority Data
June 29, 1972 Luxembourg.......................... 65630

[52] U.S. Cl. ... 214/16.4 R, 214/DIG. 4, 294/67 AB, 294/86 R, 214/1
[51] Int. Cl............................................... B65g 1/06
[58] Field of Search...................... 294/67 AB, 86 R; 214/16.4 R, 16.4 A, 654, DIG. 4

[56] References Cited
UNITED STATES PATENTS

| | | | |
|---|---|---|---|
| 1,031,412 | 7/1912 | Atkinson........................ | 214/DIG. 4 |
| 1,115,106 | 10/1914 | Ramage......................... | 214/DIG. 4 |
| 2,461,394 | 2/1949 | Plante............................... | 294/86 R |
| 2,957,583 | 10/1960 | Bushridge.................. | 214/16.4 R X |
| 3,101,852 | 8/1963 | Pearne........................ | 214/16.4 R X |
| 3,163,457 | 12/1964 | Renfroe........................... | 294/67 AB |

FOREIGN PATENTS OR APPLICATIONS

| | | | |
|---|---|---|---|
| 1,397,427 | 1/1964 | France............................ | 294/67 AB |
| 1,025,336 | 2/1958 | Germany ........................... | 214/654 |
| 1,917,114 | 12/1970 | Germany.......................... | 294/86 R |
| 6,707,377 | 3/1968 | Netherlands................... | 294/67 AB |
| 309,662 | 3/1969 | Sweden............................ | 294/86 R |

Primary Examiner—Robert J. Spar
Assistant Examiner—R. B. Johnson
Attorney, Agent, or Firm—Stevens, Davis, Miller & Mosher

[57] ABSTRACT

A device for storing and handling long, heavy metal rods of different and large diameters comprises two self-locking gripper arms connected to a body portion which is adapted to slide vertically in a vertical frame. The gripper arms have a locking action proportional to the weight of the rod which is required to be handled and their free ends are provided with locating rods to facilitate the gripping action. A rack for holding the long rods in a horizontal position is used with the gripper system. The device has the advantage that storage area is utilized more efficiently and safely and affords ready identification of materials.

3 Claims, 2 Drawing Figures

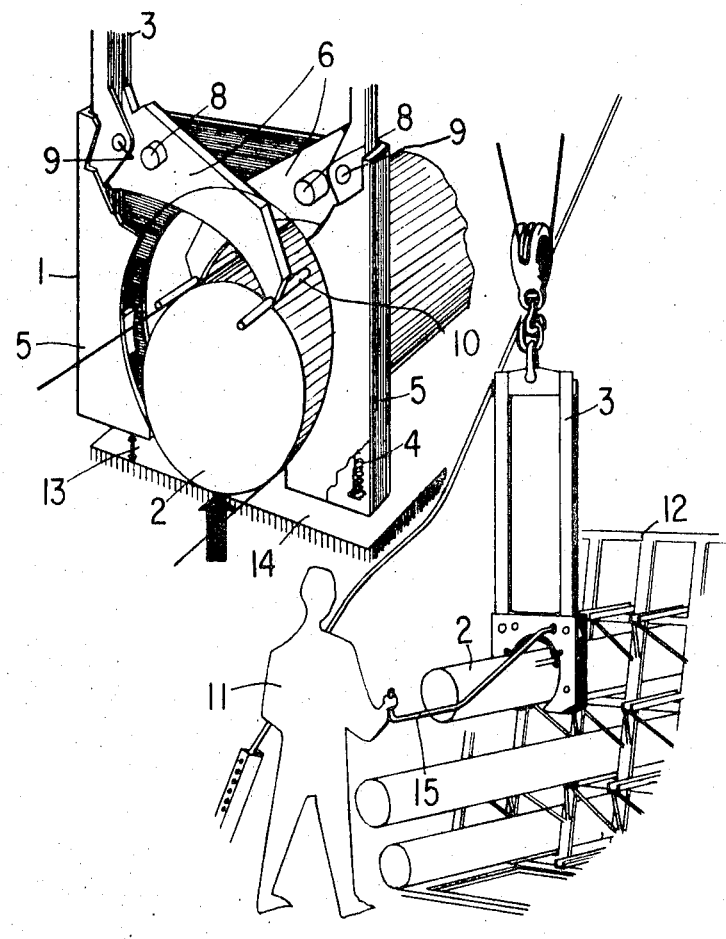

DEVICE FOR STORING AND HANDLING MATERIAL AND ROD FORM

This invention relates to a device for handling rods, more particularly heavy metal rods of different diameters, which are stacked in a plurality of layers horizontally in a rack.

Generally speaking, in stores where very different types of material — both as regards quality and dimensions — are required to be withdrawn at frequent intervals, those components which have the same characteristics (diameter or quality) are grouped together to facilitate their indentification. Also, conventional handling equipment (e.g. grabs, slings) used with conventional lifting means, do not allow the material to be stacked because the handling time would then be much greater than the time required for work on the material, delivery and distribution.

These stores thus require a large ground area and a large staff engaged in unproductive handling.

The device according to the present invention comprises a specially designed rack and a system of grippers adapted to such racks.

According to the present invention there is provided a device for storing and handling material in the form of long large-diameter rods said device comprising a body portion and two self-locking gripper arms connected to the body portion and having a locking action proportional to the weight of the rod which is required to be handled, the body portion being adapted to slide vertically in a vertical frame and proportionally to the weight of the rod required to be handled, the gripper arms having their free ends provided with at least one locating rod.

The locating rods situated at the free ends of the gripper arms are preferably disposed parallel to the axis of the rod requiring to be manipulated.

The present invention will now be described, by way of example only, with reference to the accompanying drawings in which:

FIG. 1 shows a rack containing three long, horizontally disposed rods, and

FIG. 2 is a perspective view of a device in position gripping one end of a long, large-diameter rod.

In the drawings, gripper 1 has a body portion 5 in the form of a rigid frame the aperture of which defines the maximum diameter of the rods 2 which are to be handled. Inside the frame there is a self-locking device comprising two gripper arms 6 pivotally connected to the frame by pivots 8 and linked to suspension links 3 via pivots 9. The free ends of the gripper arms 6 are provided with rods 10 adapted to facilitate location of the gripper on the equipment and compensate for any lack of centering with respect to the component 2 requiring to be handled. The construction is such that the locking force is proportional to the weight of the load being transported. In the inoperative state, springs 4, which are connected to links 3, compensate for the weight of the fixed part and thus hold the locking arms in the open position. An operating lever 15 secured to the frame facilitates location of the gripper for the operator 11 and also guidance of the gripper assembly during transportation of the load.

The spacing between the suspension links 3 defines the maximum size of the material which can be lifted, and their length defines the possible storage height (approximately one-half of the clearance beneath the hook of the lifting equipment in use). If required, telescopic suspension links may be used, thus increasing the possible storage height.

The advantages of the gripper are easy handling, direct pickup or deposition of material on the ground or at machine working level 14, this effect being obtained as a result of the clearance 13 which varies according to the diameter of the material being transported which is always positive.

The rack 12 is so designed that the center of gravity of the materials stored is always slightly ahead of the rock, the material being correctly located when the gripper body comes into contact with the said frame, which is inclined and so constructed as to distribute the load produced by the large diameter rods and rack on the ground in the optimum desired manner.

The advantages of this rack are a considerable reduction of the area required for storage, ready identification and location of stored material, ease of handling and increased safety as a result of the horizontal position of the material. This is generally the position in which the material is used on the machine or on transportation equipment, and this obviates the need for any operations to turn the material round with the possible risk of accident.

We claim:

1. A device for storing and handling material in the form of large diameter rods, said device comprising a body portion including a large diameter rod supporting surface, two self-locking gripper arms, first means pivotally mounting said arms on said body portion, said arms being mounted in a criss-cross manner, said gripper arms having a locking action proportional to the weight of the rod being handled, second means pivotally connected to each end of a respective one of said gripper arms and adapted to slide vertically in said body portion a distance proportional to the diameter of the rod being handled, the gripper arms having their other ends provided with at least one locating rod, said locating rod being disposed parallel to the longitudinal axis of the large diameter rods being handled, said large diameter rods being received between said supporting surface and said gripper arms, a vertical rack for holding said large diameter rods in a horizontal position in which a portion of said large diameter rods extends beyond the front of said rack so as to provide a lifting and gripping area for said supporting surface and gripper arms and a movable support means, connected to said second means, for moving said gripper arms adjacent said rack to facilitate a transfer of said large diameter rods between said rack and said body portion and gripper arms.

2. A device according to claim 1 wherein a large diameter rod is held in said rack with the center of gravity of said large diameter rod slightly in front of said rack.

3. A device according to claim 1 wherein the rack is inclined to distribute the load of the large diameter rods and the rack on the ground in an optimum desired manner.

* * * * *